(12) United States Patent
Brehant et al.

(10) Patent No.: US 10,710,905 B2
(45) Date of Patent: Jul. 14, 2020

(54) WATER TREATMENT METHOD, AND ASSOCIATED MODULE AND FACILITY

(71) Applicant: SUEZ GROUPE, Paris la Défense (FR)

(72) Inventors: Anne Brehant, Nanterre (FR); Angélique Fabre, Viroflay (FR); Marc Philibert, Paris (FR); Laurent Guey, Rueil Malmaison (FR)

(73) Assignee: SUEZ GROUPE, Paris la Défense (FR)

( * ) Notice: Subject to any disclaimer, the term of this patent is extended or adjusted under 35 U.S.C. 154(b) by 46 days.

(21) Appl. No.: 16/063,533

(22) PCT Filed: Dec. 16, 2016

(86) PCT No.: PCT/EP2016/081420
§ 371 (c)(1),
(2) Date: Jun. 18, 2018

(87) PCT Pub. No.: WO2017/103101
PCT Pub. Date: Jun. 22, 2017

(65) Prior Publication Data
US 2018/0370818 A1 Dec. 27, 2018

(30) Foreign Application Priority Data
Dec. 18, 2015 (FR) .................. 15 62749

(51) Int. Cl.
*C02F 1/26* (2006.01)
*C02F 1/44* (2006.01)
*C02F 103/08* (2006.01)

(52) U.S. Cl.
CPC .......... *C02F 1/26* (2013.01); *C02F 1/444* (2013.01); *B01D 2325/38* (2013.01);
(Continued)

(58) Field of Classification Search
None
See application file for complete search history.

(56) References Cited

U.S. PATENT DOCUMENTS

| 3,454,489 | A | * | 7/1969 | Li | ............ | B01D 61/40 210/643 |
| 3,740,315 | A | * | 6/1973 | Li | ............ | B01D 61/40 435/262 |

(Continued)

FOREIGN PATENT DOCUMENTS

EP  0 017 283 A1  10/1980

OTHER PUBLICATIONS

Juang R-S et al: "Application of batch ultrafiltration to the separation of W/O emulsions in liquid surfactant membrane processes", Journal of Membrane Science, Elsevier BV, NL, vol. 96, No. 3, Dec. 12, 1994 (Dec. 12, 1994), pp. 193-203, XP004041519, ISSN: 0376-7388, DOI: 10.101610376-7388(94)00121-9.

(Continued)

*Primary Examiner* — Chester T Barry
(74) *Attorney, Agent, or Firm* — Young & Thompson

(57) ABSTRACT

Disclosed are water treatment processes enabling cations and anions to be extracted from an aqueous effluent by contacting the aqueous effluents with a hydrophobic liquid phase, also including at least one step of contacting the effluent with a hydrophobic solid membrane, in order to remove the residual hydrophobic liquid membrane in the effluent treated by coalescence on the hydrophobic solid membrane. The processes include seawater desalination processes. Also disclosed is a desalination module as well as its facility therefor, including at least one coalescer.

38 Claims, 3 Drawing Sheets

Figure 1:
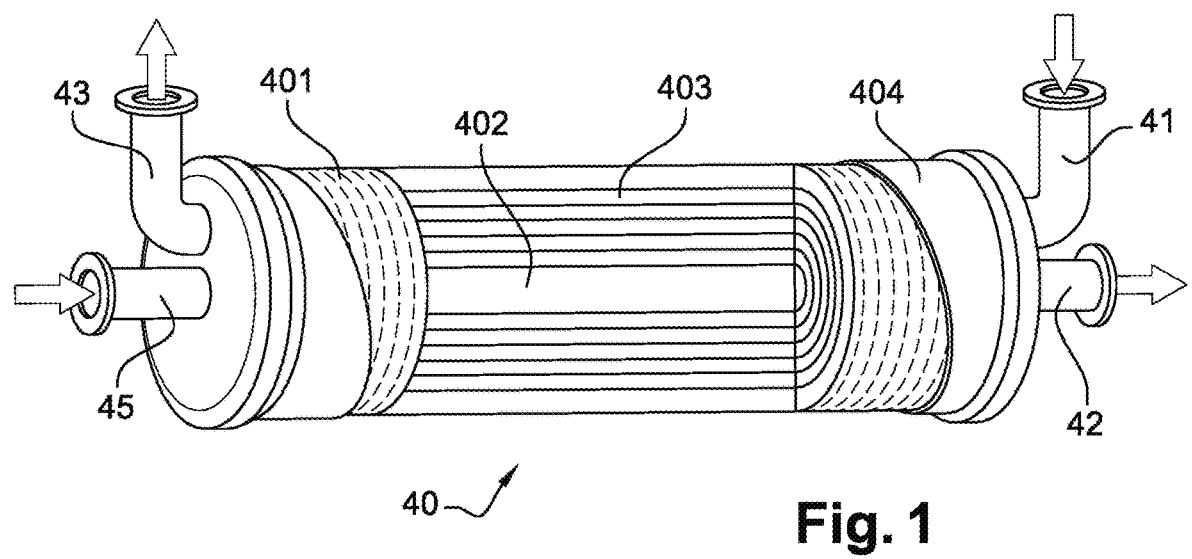

(52) U.S. Cl.
CPC ...... *C02F 2103/08* (2013.01); *C02F 2305/04* (2013.01); *Y02A 20/131* (2018.01)

(56) References Cited

U.S. PATENT DOCUMENTS

| | | | | |
|---|---|---|---|---|
| 3,779,907 A * | 12/1973 | Li | ................. | B01D 61/40 210/638 |
| 3,956,112 A * | 5/1976 | Lee | ................. | B01D 11/0415 210/644 |
| RE30,179 E * | 12/1979 | Li | ................. | B01D 61/40 210/633 |
| 4,274,956 A * | 6/1981 | Stewart | ................. | B01D 11/0415 210/638 |
| 4,283,290 A * | 8/1981 | Davies | ................. | C22B 3/0005 204/567 |
| 4,287,071 A * | 9/1981 | DiGiacomo | ................. | B01D 61/40 210/643 |
| 4,292,181 A * | 9/1981 | Li | ................. | B01D 61/40 210/638 |
| 4,337,225 A * | 6/1982 | Dines | ................. | B01D 11/0415 210/638 |
| 4,587,106 A * | 5/1986 | Bauer | ................. | B01D 11/0457 210/634 |
| 4,904,412 A * | 2/1990 | Schugerl | ................. | B01D 61/40 204/561 |
| 4,921,612 A * | 5/1990 | Sirkar | ................. | B01D 61/246 210/500.21 |
| 4,973,434 A * | 11/1990 | Sirkar | ................. | B01D 53/22 264/342 R |
| 5,190,656 A * | 3/1993 | Paul | ................. | B09C 1/02 166/312 |
| 5,637,224 A * | 6/1997 | Sirkar | ................. | B01D 61/00 210/406 |
| 9,272,388 B2 * | 3/2016 | Misra | ................. | B24B 37/042 |
| 2001/0006158 A1 * | 7/2001 | Ho | ................. | A23L 2/38 210/644 |
| 2003/0011088 A1 * | 1/2003 | Ramstack | ................. | A61K 9/1647 264/4.1 |
| 2015/0087877 A1 * | 3/2015 | Seibert | ................. | B01D 17/085 585/818 |

OTHER PUBLICATIONS

Kakoi T et al: "Selective recovery of palladium from a simulated industrial waste water by liquid surfactant membrane process", Journal of Membrane Science, Elsevier BV, NL, vol. 118, No. 1, Sep. 4, 1996 (Sep. 4, 1996), pp. 63-71, XP004041786, ISSN: 0376-7388, DOI: 10.1016/0376-7388(96)00102-0.

Sastrea A M et al: "Improved Techniques in Liquid Membrane Separations: An Overview", Separation and Purification Methods, Marcel Dekker, New York, NY, US, vol. 27, No. 2, Jan. 1, 1998 (Jan. 1, 1998), pp. 213-298, XP009159979, ISSN: 0360-2540.

International Search Report, dated Mar. 1, 2017, from corresponding PCT/EP2016/081420 application.

FR Search Report, dated Aug. 4, 2016, from corresponding FR 1 562 749 application.

* cited by examiner

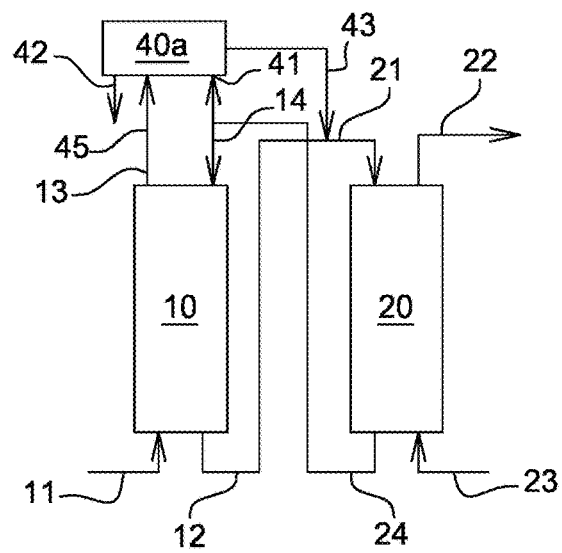
Fig. 3
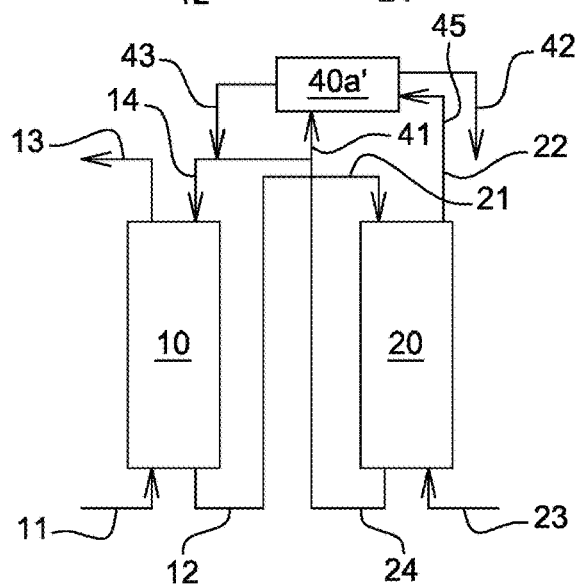
Fig. 4
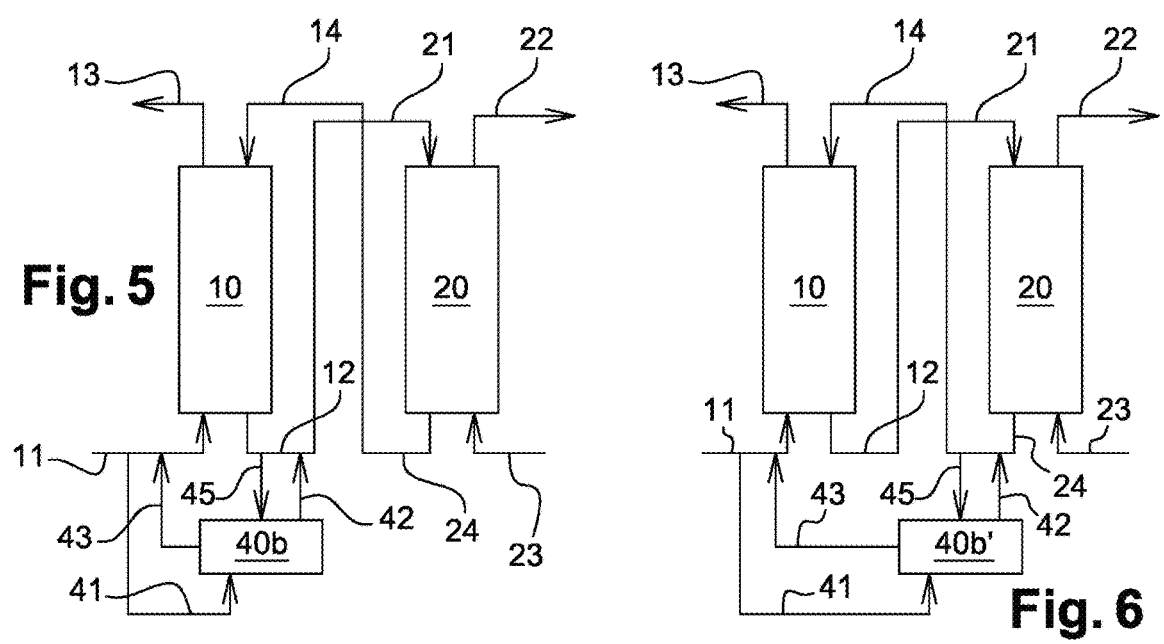
Fig. 5
Fig. 6

WATER TREATMENT METHOD, AND ASSOCIATED MODULE AND FACILITY

The present invention relates to water treatment processes enabling cations and anions to be extracted from an aqueous effluent by contacting said aqueous effluents with a hydrophobic liquid phase. The processes according to the invention comprise seawater desalination processes, where calcium, sodium, potassium, chloride, sulphate, carbonate ions will in particular be extracted, and processes for removing metal ions, for example metal cations from transition metals such as iron, gold, silver, copper, chromium, platinum, lead, tin, cadmium, cobalt, zinc, nickel, mercury, . . . or alkaline metals such as sodium, caesium, strontium, barium, rubidium, or metalloids such as arsenic . . . . One object of the invention is in particular a process for water desalination by contacting an aqueous effluent with a hydrophobic liquid membrane. Another object of the invention is a module enabling the processes according to the invention to be implemented, more particularly a desalination module as well as a facility therefor.

As regards in particular desalination processes for producing potable water from seawater, these processes are generally based on thermal or membrane treatments. However, they induce high energy consumptions. That is why numerous developments have been made during the last decade to reduce energy consumption of the facilities enabling reverse osmosis membranes (optimising membranes, developing more efficient pumps and introducing energy recovery loops). However, the overall cost of this type of facilities remains much higher than conventional processes for fresh water treatment.

Water treatment processes by liquid-liquid extraction (LLE) are innovative processes which consist in extracting cations and anions from water thanks to a phase transfer of these ions from the aqueous phase to a hydrophobic phase, which is then separated from the treated water and optionally regenerated. Such hydrophobic liquids can for example be ionic liquids, comprising one or more salts of anionic and/or cationic surfactants which are liquid at room temperature. More generally, these hydrophobic liquids can be formulations comprising one or more hydrophobic liquid bases and one or more active molecules able to transfer the anions or cations desired to be removed from the aqueous phase to the hydrophobic phase. These active substances can be dispersed or in solution in a hydrophobic liquid base or in a mixture of hydrophobic liquid bases.

The active molecules able to transfer the anions or cations desired to be removed from the aqueous phase to the hydrophobic phase can for example be anionic surfactants (to extract cations), or cationic surfactants (to extract anions), or molecules able to solvate or complex cations or anions, such as for example crown ethers, cyclic oligomers (calixarenes), or non-cyclic oligomers of phenolic derivative in the presence of crown ethers, or dithizones.

The hydrophobic liquid phases used are commonly designed by the term "liquid membranes".

These processes do not use a solid membrane, and do not require a back pressure to extract ions from water.

Thus, it is known from prior art documents which describe water pretreatment units, in particular for salt water, comprising a direct contact exchanger the continuous or dispersed fluorinated phase of which comprises a water immiscible fluorinated liquid with a specific gravity higher than 1.25. According to alternatives, the direct contact exchanger can be a heat exchanger and/or an ion exchanger. Indeed, depending on the fluorinated phase used, the transfer carried out between the fluorinated phase and the water to be treated could be a heat transfer or an ion transfer or simultaneously, a heat and ion transfer.

However, even if the liquid membranes used in the water treatment processes by liquid-liquid extraction are very hydrophobic and water inmiscible, they have however a slight water solubility. Hence, a transfer of the liquid membranes into the aqueous phase is observed over time in these processes. These transfers can come from soluble compounds which migrate from the liquid membrane to water over time.

Microdroplets can also exit the system because of the following dysfunctions:
- uncontrolled emulsion of liquid/water phases causes separation issues,
- during treatment or regeneration operations, the liquid membrane is driven away in the treated water flow or in the regeneration brine flow, because of an unsuitable ratio of the counter-current flow rates,
- wear of the liquid membrane causes under-performance in ion extraction.

As a result, the following drawbacks arise:
- an overcost related to the liquid membrane loss, that has to be replaced therefore,
- contamination of treated water by traces of liquid membrane,
- contamination of brine by traces of liquid membrane, the brine coming from the regeneration of the liquid membrane.

One purpose of the invention is thus to remove all or part of the abovementioned drawbacks, by recovering the loss of one of the phase in the other. Further, it enables the problem of sensitivity of current coalescence devices upon precipitating salts contained in the brines to be solved.

More particularly, one object of the invention is a process for the treatment of an aqueous effluent comprising the steps of:
(a) liquid-liquid extraction, by contacting the aqueous effluent with a water immiscible hydrophobic liquid membrane, allowing ion transfer from the aqueous phase to the hydrophobic liquid phase,
(b) separating the aqueous effluent and the hydrophobic liquid membrane from step (a),
(c) contacting the effluent from step (b) with a hydrophobic solid membrane, in order to remove the residual hydrophobic liquid membrane in said effluent by coalescence on said hydrophobic solid membrane.

Optional complementary or substitute characteristics of the invention are set out hereinafter.

The hydrophobic liquid membrane can comprise at least one compound chosen from the group of anionic surfactants and/or cationic surfactants, and/or calixarenes, preferentially calix[4]arenes, and/or crown ethers, preferentially 18-6 crown ethers, or 12-4 crown ethers or 15-5 crown ethers, and/or dithizones.

The anionic surfactants can be chosen from carboxylate salts, alkyl benzoates, carboxiimidates, alkoxides or dialkoxides, alkylsulphates, alkylsulphonates, ether sulphonates, sulphonylimides, phosphine oxides, phosphinates, alkyl borates.

The cationic surfactants can be chosen from alkylsulphonium, alkylammonium, alkylphosphonium, alkylimidazolium, alkyloxazaborolidinium, alkyloxazolidinium salts.

The separation step (b) can be a settling step.

The hydrophobic solid membrane can comprise a material chosen from polypropylenes, polyethylenes, polyvinylidene fluorides, polytetrafluoroethylenes, polyacrylonitriles, polyolefines, polyvinyl chlorides, polyethylene-terephthalates, polyolefine copolymers, polyetherketones as well as ceramics.

The hydrophobic solid membrane can consist of hollow fibres.

According to one alternative, the liquid-liquid extraction (a) and separation (b) steps are made in a first treatment enclosure, the aqueous effluent treated and the hydrophobic liquid membrane being separately extracted off the first treatment enclosure at the end of steps (a) and (b), contacting the aqueous effluent from step (b) (thus treated), with a hydrophobic solid membrane, occurring after the aqueous effluent treated is discharged off the first treatment enclosure.

According to another alternative, the liquid-liquid extraction (a) and separation (b) steps are made in a first treatment enclosure, the aqueous effluent treated and the hydrophobic liquid membrane being separately extracted off the first treatment enclosure at the end of steps (a) and (b), contacting the aqueous effluent from step (b) (thus treated), with a hydrophobic solid membrane, occurring before the aqueous effluent treated is discharged off the first treatment enclosure.

The step of contacting the aqueous effluent from step (b) with the hydrophobic solid membrane can be carried out in a substantially cylindrical shaped contactor, provided with a central channel and a hydrophobic solid membrane consisting of longitudinal porous and hollow fibres, such that the residual hydrophobic liquid membrane radially migrates up to inside the fibres. The circulation of fluids inside this contactor could be a co-current, a counter-current or a cross flow circulation.

The treatment process can further comprise a step (e) of contacting the hydrophobic liquid membrane from step (b) with a hydrophilic solid membrane, in order to remove the residual effluent in the hydrophobic liquid membrane, by coalescence on said hydrophilic solid membrane.

The hydrophilic solid membrane can comprise a material chosen from polysulphones, polyvinylidene fluorides, polyvinylpyrolidones, cellulose acetate, polyether sulphones, optionally modified or with additive, ceramics.

The process can further comprise a step of regenerating (d) the hydrophobic liquid membrane from step (b).

According to one alternative, the hydrophobic liquid membrane extracted from the first treatment enclosure is taken into a second regeneration enclosure where it is contacted with water, the regenerated hydrophobic liquid membrane and water being then separated and discharged off the second enclosure, and the regenerated hydrophobic liquid membrane being then contacted with a hydrophilic solid membrane after discharging off the second enclosure so as to remove water traces.

The hydrophobic liquid membrane from the coalescence step is reused in step (a) of the treatment process.

The treatment can be a treatment of desalination of water, in particular desalination of seawater.

The regeneration of the hydrophobic liquid membrane can be carried out between 70 and 90° C., preferentially around 80° C.

The pressure differential during step (c) of contacting with a hydrophobic solid membrane can be between 1 and 5 bars.

The pressure differential during step (e) of contacting with a hydrophilic solid membrane, can be between 1 and 5 bars.

Another object of the invention is a module for treatment by contacting an aqueous effluent with a hydrophobic liquid membrane for the implementation of the process according to the invention, the module including at least one liquid-liquid extraction enclosure, means for taking and discharging the effluent, respectively, into and off said enclosure, means for taking and discharging the hydrophobic liquid membrane, respectively, into and off said enclosure, characterised in that it further comprises at least one first coalescer with a hydrophobic solid membrane in fluid communication with said enclosure by means of a first inlet bleed in the coalescer provided on the means for discharging the effluent off said enclosure, in order to remove the traces of hydrophobic liquid membrane residually present in the aqueous effluent.

The liquid-liquid extraction enclosure can comprise a liquid-liquid extraction column.

The liquid-liquid extraction enclosure can comprise a blender/settler or any other liquid-liquid extraction contactor.

The liquid-liquid extraction enclosure and the first coalescer can form one and a single unit consisting of a membrane contactor.

The modules according to the invention are suitable for implementing water treatment processes to extract salts present in a wide range of aqueous effluents from petrol and gas industry, waters from mining, landfill leachates, waste water from incinerating plants.

One object of the invention is in particular a module for desalination by contacting an aqueous effluent with a hydrophobic liquid membrane for the implementation of the process according to one embodiment of the invention, the module comprising at least one desalination enclosure, means for taking and discharging the effluent, respectively, into and off said enclosure, means for taking and discharging the hydrophobic liquid membrane, respectively, into and off said enclosure, characterised in that it further comprises at last one first coalescer with a hydrophobic solid membrane in fluid communication with said enclosure by means of a first inlet bleed in the coalescer provided on the means for discharging the effluent off said enclosure, in order to remove the traces of hydrophobic liquid membrane residually present in the aqueous effluent.

Optional complementary or substitute characteristics of the invention are set out hereinafter.

The first coalescer can be in fluid communication by means of second and third outlet bleeds, with respectively the means for taking and discharging the hydrophobic liquid membrane, into and off said enclosure.

The hydrophobic liquid membrane can comprise at least one compound chosen from the group of anionic surfactants and/or cationic surfactants, and/or calixarenes, preferentially calix[4]arenes, and/or crown ethers, preferentially 18-6 crown ethers, or 12-4 crown ethers or 15-5 crown ethers, and/or dithizones.

The anionic surfactants can be chosen from carboxylate salts, alkyl benzoates, carboxiimidates, alkoxides or dialkoxides, alkylsulphates, alkylsulphonates, ether sulphonates, sulphonylimides, phosphine oxides, phosphinates, alkyl borates.

The cationic surfactants can be chosen from alkylsulphonium, alkylammonium, alkylphosphonium, alkylimidazolium, alkyloxazaborolidinium, alkyloxazolidinium salts.

The first coalescer can be a substantially cylindrical shaped contactor, provided with a central channel and a hydrophobic solid membrane consisting of longitudinal porous and hollow fibres.

The materials making up the hydrophobic solid membrane can be chosen in the list defined by polypropylenes, polyethylenes, polyvinylidene fluorides, polytetrafluoroethylenes, polyacrylonitriles, polyolefines, polyvinyl chlorides, polyethylene-terephthalates, polyolefine copolymers, polyetheretherketones, as well as ceramics.

The desalination enclosure can comprise a liquid/liquid extraction column.

The desalination enclosure can comprise a blender/settler or any other liquid-liquid contactor.

The desalination enclosure and the first coalescer form one and a single unit consisting of a membrane contactor.

The desalination module can further comprise a second coalescer with a hydrophilic solid membrane in fluid communication with the desalination enclosure of the first module by means of a first inlet bleed in the coalescer provided on the means for discharging the hydrophobic liquid membrane off said enclosure, in order to remove the traces of aqueous effluent residually present in the hydrophobic liquid membrane.

The second coalescer can be in fluid communication by means of second and third outlet bleeds, with the means for taking the aqueous effluent into the enclosure of the first module.

The second coalescer can be a substantially cylindrical shaped contactor, provided with a central channel and a hydrophilic solid membrane consisting of longitudinal porous and hollow fibres.

The materials making up the hydrophilic solid membrane can be chosen from the list defined by polysulphones, polyvinylidene fluorides, polyvinylpyrolidones, cellulose acetate, polyether sulphones, optionally modified or with additives, ceramics.

According to a particular embodiment, the desalination module comprises a coalescer dedicated to desalination and provided with a substantially cylindrical shaped contactor, provided with a central channel and a hydrophobic solid membrane consisting of longitudinal porous and hollow fibres, means for taking into the central channel a mixture consisting of the aqueous effluent and the hydrophobic liquid membrane, blending being made in a particular blinding unit, means for discharging the desalted effluent off the central channel, taking and discharging means connected to a first hydrophobic liquid membrane recirculation loop inside the longitudinal fibres.

Another object of the invention is a facility for desalination of an aqueous effluent, in particular of seawater, characterised in that it comprises a first desalination module in accordance with one of the embodiments of the invention.

Optional complementary or substitute characteristics of the invention are set out hereinafter.

The facility can further comprise a second module for regenerating the hydrophobic liquid membrane, the means for taking the hydrophobic liquid membrane into the first desalination module of the aqueous effluent being in fluid communication with the means for discharging the hydrophobic liquid membrane off the second regeneration module of the hydrophobic liquid membrane, whereas the means for taking the hydrophobic liquid membrane into the second regeneration module are in fluid communication with the means for discharging the hydrophobic liquid membrane off the first desalination module.

The facility can further comprises a third coalescer in fluid communication with the regeneration enclosure of the second module by means of a first inlet bleed in the coalescer provided on the mean for discharging the brine off said enclosure, in order to remove the traces of hydrophobic liquid membrane residually present in the brine.

According to a particular embodiment, the facility can further comprise a second module for regenerating the hydrophobic liquid membrane, said second module comprising a regeneration coalescer provided with a substantially cylindrical shaped contactor, provided with a central channel and with a hydrophobic solid membrane consisting of longitudinal porous and hollow fibres, means for taking into the central channel a mixture consisting of fresh water from a water point and a hydrophobic liquid membrane from the first module, means for discharging the brine off the central channel, means for taking and discharging connected to a second hydrophobic liquid membrane recirculation loop inside the longitudinal fibres of the contactor.

The facility can further comprise a fourth coalescer with a hydrophobic solid membrane in fluid communication with the enclosure for regenerating the second module by means of a first inlet bleed in a coalescer provided on the means for discharging the hydrophobic liquid membrane off said enclosure, in order to remove the traces of aqueous effluent residually present in the hydrophobic liquid membrane.

The fourth coalescer can be in fluid communication by means of second and third bleeds, with the means for taking the aqueous effluent into the enclosure of the first module.

The first coalescer can be a substantially cylindrical shaped contactor, provided with a central channel and a hydrophilic solid membrane consisting of longitudinal porous and hollow fibres.

The materials making up the hydrophilic solid membrane are chosen in the list defined by polysulphones, polyvinylidene fluorides, polyvinylpyrolidones, cellulose acetate, polyether sulphones, optionally modified or with additive, ceramics.

Figure 2:
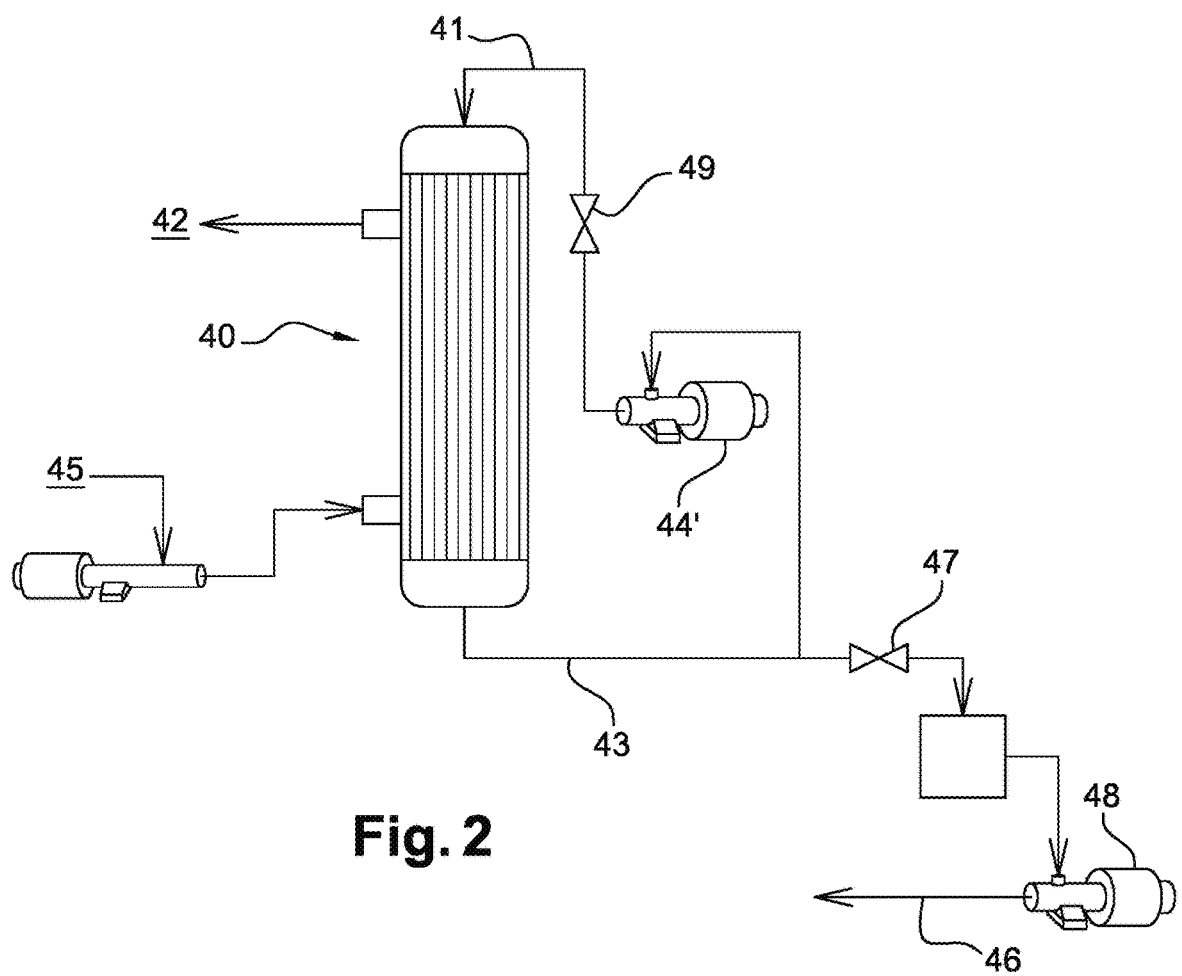

Further advantages and features of the invention will appear upon reading the detailed description of implementations and embodiments in no way limiting, and the following appended drawings:

FIG. 1 is a schematic representation of a detail of a coalescer according to the invention, FIG. 2 is a schematic representation of another detail of a coalescer according to the invention, FIGS. 3, 4, 5, 6, 7 are schematic representations of embodiments of a desalination facility according to the invention.

The processes according to the invention comprise a liquid-liquid extraction (LLE) step which consists in extracting cations and anions from water thanks to a phase transfer of these ions from the aqueous phase to a hydrophobic liquid phase, which is then separated from the treated water and optionally regenerated.

The hydrophobic liquid phases used in the processes, modules and facilities according to the invention are commonly designated with the term "liquid membranes".

Such hydrophobic liquid membranes can for example be ionic liquids, comprising one or more salts of anionic and/or cationic surfactants which are liquid at room temperature. More generally, these hydrophobic liquids can be formulations comprising one or more hydrophobic liquid bases and one or more active molecules able to transfer anions or cations desired to be removed from the aqueous phase to the hydrophobic phase. These active substances can be dispersed or in solution in a hydrophobic liquid base or in a mixture of hydrophobic liquid bases. The hydrophobic liquid bases can for example be hydrocarbon liquid bases for example aliphatic hydrocarbons, preferentially comprising between 6 and 22, preferentially between 10 and 18 carbon atoms or aromatic hydrocarbons. These hydrophobic liquid bases can also be alkyl phenols, alcohols or fatty acids, or fatty esters, for example benzoic acid fatty esters. These bases can also include substituted hydrocarbon chains, for example halogenated, for example fluorinated chains, to provide the hydrophobic liquid with a specific gravity higher than that of water. As a hydrophobic liquid base, hydrofluorocarbons or perfluorocarbons can for example be used.

The active molecules able to transfer anions or cations desired to be removed from the aqueous phase to the hydrophobic phase can for example be anionic surfactants (to extract cations), or cationic surfactants (to extract anions), or molecules able to solvate or complex cations or anions, as for example crown ethers, calixarenes, or dithizones.

As an anionic surfactant, carboxylate salts, alkyl benzoates, carboxiimidates, alcoxides or dialkoxides, carboxiimidates, alkylsulphates, alkylsulphonates, ether sulphonates, sulphonylimides, phosphine oxides, phosphinates, alkyl borates, can be preferentially mentioned.

As a cationic surfactant, alkylsulphonium, alkylammonium, alkylphosphonium, alkylimidazolium, alkyloxazaborolidinium, alkyloxazolidinium salts, . . . for example their salts formed with tetrafluoroborate, chloride, hexafluorophosphate, mesylate, tosylate, triflate anions can preferentially be mentioned.

The hydrophobic chains of these surfactants can be saturated or unsaturated linear or branched alkyl chains, optionally substituted, for example with aryl substituents, or for example halogenated, in particular fluorinated or perfluorinated.

The molecules able to solvate ions can for example be crown ethers, in particular 18-6 crown ethers or 12-4 crown ethers or 15-5 crown ethers, having a particular affinity respectively for K+, Li+, et Na+ ions. These are for example calixarenes, in particular calix[4]arenes having a particular affinity for Na+, Cu2+, Zn2+ ions, or even dithizones, having a particular affinity for lead and mercury. These molecules can also include various hydrocarbon substituents, aryl substituents, or saturated or unsaturated linear or branched or cyclic alkyl substituents, optionally substituted, for example halogenated, for example fluorinated or perfluorinated.

The hydrophobic liquid membranes suitable for the water desalination processes, in which calcium, sodium, potassium, chloride, sulphate, carbonate ions are in particular extracted, advantageously comprise for example one or more of the following compounds chosen among:
  alkyl ammonium or alkyl phosphonium surfactants, having an affinity for chloride ions, and/or
  crown ethers having an affinity for sodium or potassium ions, and/or
  calixarenes having an affinity for sodium and/or potassium ions
  carboxylate, phosphonate, sulphate, phosphate, alkoxide surfactants, preferentially phenolates, esters, preferentially benzoates, for their affinity with sodium and potassium cations.

Preferentially, the liquid membranes have a specific gravity higher than that of water, a strong hydrophobicity, and are regenerable at a relatively low temperature (by way of indication about 80° C.)

Preferentially, the hydrophobic liquid membranes used in desalting seawater have the following characteristics:
  hydrophobic,
  specific gravity higher than water,
  interfacial tension sufficient to improve contact with water,
  sufficient affinity with ions included in the list defined by $Na^+$, $Cl^-$, $K^+$, $Mg^{2+}$ and $SO4^{2-}$, $CO3^{2-}$.
  ability to extract complex salts from the hydrophobic liquid membrane (regeneration) at a temperature of about 80° C.,
  ability to extract complex salts from water at a low temperature (room temperature).

In order to gather all the characteristics above, the viscosity of ion exchange liquids will be generally between 10 and 60 times the water dynamic viscosity.

Those skilled in the art will be able to adapt the formulation of liquid membranes so as to obtain all or part of the abovementioned characteristics and so as to extract target cations or anions to be removed in the process.

The hydrophobic liquid membrane can be formulated from active principles comprising methyl trioctyl/decylamine chloride (Aliquat 336), trihexyl(tetradecyl)phosphonium chloride (Cyphos IL 101), tributyl(tetradecyl)phosphonium chloride (Cyphos IL 167) in a solvated phase or diluted in 10% decanol/kerosene. For more detail, those skilled in the art will report to the publication entitled "Ionic liquids as a carrier for chloride reduction from brackish water using hollow fibre renewal liquid membrane" (Spain) and published by A. Fortuny et al in the review "Desalination" in 2013.

The hydrophobic liquid membrane could be formulated from active principles comprising phosphine oxide mixtures: $R_3PO+R_2R'PO+RR'_2PO+R'_3PO$ with $R=CH_3(CH_2)_7$ and $R'=CH_3(CH_2)_5$ (Cyanex 923) in a solvated phase or diluted in an aliphatic diluent (Exxsol D100), or an aromatic diluent (Solvesso 200). For more detail, those skilled in the art will report to the publication entitled "Extraction and permeation studies of Cd(II) in acidic and neutral chloride media using Cyanex 923 on supported liquid membrane".

The hydrophobic liquid membrane could be formulated from active principles comprising trioctyl/decylmethylammonium-bis(2,4,4-trimethylpentyl) phosphinates (ALiCY IL), trioctyl/decylmethylammonium decanoates (ALiDEC IL), in a solvated phase or diluted in 10% decanol or kerosene. For more detail, those skilled in the art will report to the publication entitled "Boron reduction by supported liquid membranes using ALiCY and ALiDEC ionic liquids as carriers>>" (Spain) and published by M. T. Coll in the review "Chemical Engineering Research and Design" in 2014.

The hydrophobic liquid membrane could be formulated from active principles comprising 1-alkyl-3-methylimidazolium hexafluoro-phosphates, bis [(trifluoromethyl)sulphonyl] imides, bis [(perfluoroethyl)sulphonyl] imides, dicyclohexano-18-crowns-6. For more detail, those skilled in the art will report to the publication entitled "Ionic liquid anion effects in the extraction of metal ions by macrocyclic polyethers" (USA) and published by S. L. Garvey in the review "Separation and Purification Technology" in 2014.

The hydrophobic liquid membrane could be formulated from active principles comprising acetates, tetrafluoroborates, hexafluorophosphonates, methylsulphates, dimethylphosphates, trihexyl(tetradecyl)phosphonium chlorides (Cyphos IL 101), Cocosalkyl (ECOENG500), 1-alkyl-3-methylimidazolium, 1-allyl-3-methylimidazolium, in a solvated phase or diluted in benzene, hexane, chlorobenzene, phenols, benzoic acids, benzamides. For more detail, those skilled in the art will report to the publication entitled "Methods for recovery of ionic liquids—A review" (Republic of Korea) and published by N. L. Mai in the review "Process biochemistry" in 2014.

The hydrophobic liquid membrane could be formulated from active principles comprising phenylglyoximes, P-tolylglyoximes, N'-(4'-benzo[15-crown-5])phenylaminoglyoximes, N'-(4'-benzo[15-crown-5])tolylaminoglyoximes, crown ether+oxime compounds. For more detail, those skilled in the art will report to the publication entitled "Liquid-liquid extraction of transition metal cations by glyoximes and their macrocyclic glyoxime ether derivatives" (Turkey) and published by N. Karapinar in the review "Journal of Chemistry" in 2013.

The hydrophobic liquid membrane could be formulated from active principles comprising tris[(L)-alanyl-2-carboxamidoethyl] amines. For more detail, those skilled in the art will report to the publication entitled "Coordination du CU(II) et Ni(II) avec un ligand polydenté azoté et synthèse de liquides inoiques dérivés de la betaïne: Application à l'extraction liquide-liquide de métaux" (France) and published by A. Messadi in the review "Thèse Université de Reims Champagne Ardenne" in 2013.

The hydrophobic liquid membrane could be formulated from active principles comprising imidazolium, ammonium, pyridinium, pyrrolidinium, sulphonium, phosphonium, tetrafluoroborates, hexafluorophosphates, trifluoroacetates, trifluoromethanesulphonates, bis(trifluorosulphonyl)imides, crown ethers, calixarenes, trioctyl oxides.

The hydrophobic liquid membrane could be formulated from active principles comprising tributyl(2-ethoxy-2-oxoethyl)ammonium, dicyanamides (Dca), bis(trifluoromethylsulphonyl)imides (NTf2). For more detail, those skilled in the art will report to the publication entitled "Task-specific ionic liquid with coordinating anion for heavy metal ion extraction: Cation exchange versus ion-pair extraction" (France) and published by A. Messadi in the review "Separation and Purification Technology" in 2013.

The hydrophobic liquid membrane could be formulated from active principles comprising ethylaminediacetic acids. For more detail, those skilled in the art will report to the publication entitled "Removal of metal ions from aqueous solutions using chelating task-specific ionic liquids" published by Harjani in the review "Journal of Materials Chemistry" in 2008.

The hydrophobic liquid membrane could be formulated from active principles comprising 1-alkyl-3-, methylimidazolium hexafluorophosphates ([C n mim][PF6], n=4, 6, 8), with as ligands, crown ethers of the 18-crown-6 (18C6) type, dicyclohexano-18-crown-6 (DCH18C6), 4, 4'-(5')-di-(tert-butylcyclohexano)-18-crown-6 (Dtb18C6). For more detail, those skilled in the art will report to the publication entitled "Traditional extractants in nontraditional solvents: Groups 1 and 2 extraction by crown ethers in room-temperature ionic liquids" and published by Visser in the review "Industrial & Engineering Chemistry Research" in 2000.

The hydrophobic liquid membrane could be formulated from active principles comprising $R1=CH_2CH_3$, $R2=H$, $R3=CH_3$ 1-ethyl-3-methylmidazolium (emim+), $R1=NH_2(CH_2)_3CH_3$ $R2=H$, $R3=CH_3$ N-aminopropyl-3-methylmidazolium (NH2pmim+), $R1=(CH_2)_3CH_3$ $R2=H$, $R3=CH_3$ 1-butyl-3-methylmidazolium (bmim+), $R1=(CH_2)_5CH_3$, $R2=H$, $R3=CH_3$ 1-hexyl-3-methylmidazolium. For more detail, those skilled in the art will report to the publication entitled "Recent advances in supported ionic liquid membrane technology" (Spain) and published by L. J. Lozano in the review "Journal of Membrane Science" in 2011.

The hydrophobic liquid membrane could be formulated from active principles comprising 1-methyl-1-[4,5-bis (methylsulphide)]pentylpyrrolidinium ([MPS2PYRRO]+), 1-methyl-1-[4,5-bis(methylsulphide)] pentylpiperidinium ([MPS2PIP]+), 1-methyl-2-pentenepyrrolidinium ([MPT-PYRRO]+), 1-methyl-2-pentenepiperidinium ([MPTPIP]+), 1-butyronitril. For more detail, those skilled in the art will report to the publication entitled "Extraction of noble metal ions from aqueous solution by ionic liquids" (Singapore) and published by J. M. Lee in the review "Fluid Phase Equilibria" in 2012.

The hydrophobic liquid membrane could be formulated from active principles comprising dicychlohexano-18-crown-6, dithizone, 18-crown-6, 1-(2-pyridylazo)-2-naphthols, 1-(2-thiazolylazo)-2-naphthols, tri-n-butylphosphates, 4,4-(5)-di-(tert-butylcyclohexano)-18-crown-6, calyx[4] arene-bis(tertoctylbenzo-crown-6). For more detail, those skilled in the art will report to the publication entitled "The use of ionic liquids as "green" solvents for extractions" 0 and published by H. Zhao in the review "Journal of chemical technology & biotechnology" in 2005.

The hydrophobic liquid membrane could be formulated from active principles comprising calixarenes, calix[4] arenes bearing carboxymethoxygroups. For more detail, those skilled in the art will report to the publication entitled "Calixarene-Based Molecules for Cation Recognition" (Germany) and published by R. Ludwig in the review "Sensors" in 2002.

The hydrophobic liquid membrane could be formulated from active principles comprising calix[n]arenes coupled to diazo p-(4-phenylazo)calix[4]arene (L1), p-phenylazocalix [6]arene (L2)] groups, phenol derivatives, 2,6-dimethyl-3-phenylazophenols (L3), 2-(5-bromo-2-pyridylazo)-5-diethylamino phenols (L4). For more detail, those skilled in the art will report to the publication entitled "Comparative studies on the solvent extraction of transition metal, cations by calixarene, phenol and ester derivatives" (Turkey) and published by H. Deligoz in the review "Journal of Hazardous materials" in 2007.

The hydrophobic liquid membrane could be formulated from active principles comprising calixarene or resorcinarenes, calix[4]arenes based receptors including oxygen atoms from carbonyl ether or groups, in a solvated phase or diluted in chloroform. For more detail, those skilled in the art will report to the publication entitled "Calixarene and Resorcinarenes" (Poland) and published by W. Sliwa in the review "Wiley-vch edition" in 2009.

The hydrophobic liquid membrane could be formulated from active principles comprising secondary amide derivatives calix[4]arene, 5,11,17,23-tetra(tert-butyl)-25,26,27,28-tetra(N-hexylcarbamoylmethoxy)calix[4]arene in a solvated phase or diluted in benzonitrile, in methanol. For more detail, those skilled in the art will report to the publication entitled "The effect of specific solvent-solute interactions on complexation of alkali-metal cations by a lower-rim calix [4]arene amide derivative" and published by G. Horvat in the review "Inorganic Chemistry" in 2013.

The hydrophobic liquid membrane could be formulated from active principles comprising di-2-ethylhexyl phosphoric acids, ethylhexyl phosphoric acids (C16H3504P) in a solvated phase or diluted in kerosene. For more detail, those skilled in the art will report to the publication entitled "Simultaneous removal of copper, nickel and zinc metal ions using bulk liquid membrane system" (India) and published by R. Singh in the review "Desalination" in 2011.

The hydrophobic liquid membrane could be formulated from active principles comprising tricaprylmethylammonium thiosalicylates, [A336][TS], tricaprylmethylammonium 2-(methylthio) benzoates, [A336][MTBA], tricaprylmethylammonium benzoates, [A336][BA], tricaprylmethylammonium benzoates, [A336][BA], tricaprylmethylammonium. For more detail, those skilled in the art will report to the publication entitled "Ionic liquids for extraction of metals and metal containing compounds from communal and industrial waste wates" (Austria) and published by L. Fischer in the review "Wates Research" in 2011.

In FIGS. 3, 4 and 5, different embodiments of desalination facilities are represented. In each of the FIGS., there are a desalination enclosure 10 and a regeneration enclosure 20 in which an aqueous effluent is in contact with an ion exchanger liquid (also called a hydrophobic liquid membrane). The enclosures 10 and 20 respectively include means for taking 11, 23 and discharging 13, 22 the aqueous effluent. They also include means for taking 14, 21 and discharging 12, 24 the ion exchanger liquid. These taking and discharging means can be ducts equipped with valves.

As referenced 40a, 40a', 40b in FIGS. 3, 4 and 5 respectively and as represented in more detail in FIGS. 1 and 2, at least one of the modules integrates a coalescer 40a, 40a', 40b in order to separate the hydrophobic liquid membrane from the effluent, herein in a favoured application, seawater.

By "coalescer", it is defined a hydrophobic membrane contactor allowing a separation process between two phases, by means of a large contact area of the microporous membrane which allows coalescence of droplets from the trace phase to the other phase.

By coalescer, it is also meant an enclosure comprising a solid membrane, and in which a biphase liquid mixture is introduced, for example a mixture of a hydrophobic liquid and an aqueous effluent, and where the membrane has an affinity for one of the phases and not for the other. A coalescer provided with a hydrophobic solid membrane is for example supplied with an aqueous effluent containing traces of hydrophobic liquid. The traces of hydrophobic liquid will coalesce at the surface of the solid membrane. These coalesced droplets could migrate to inside the membrane, which can be porous, for example under the effect of a pressure differential.

To recover water traces in a hydrophobic liquid, the same is carried out but using a coalescer provided with a hydrophilic solid membrane, which will be supplied with a hydrophobic liquid containing trace water.

The membrane could be in the form of porous hollow fibres. The diphase mixture is for example introduced outside the fibres. The trace liquid to be recovered migrates to inside the hollow fibres of the membrane by virtue of the porosity of the fibres, and possibly of a pressure differential between inside and outside the fibres. The coalescer can also be supplied from inside the fibres, in a countercurrent, co-current or cross flow way, by a flow of liquid identical to that trace-recovered, and which will drive the coalesced droplets that have migrated inside the fibres outside the coalescer.

The coalescer can comprise a solid hydrophobic membrane, for example of porous hollow fibres, for example of materials chosen in the list defined by polypropylenes, polyethylenes, polyvinylidene fluorides, polytetrafluoroethylenes, polyacrylonitriles, polyolefines, polyvinyl chlorides, polyethylene-terephthalates, polyolefine copolymers, polyetherketones, as well as ceramics.

The coalescer can comprise a solid hydrophilic membrane, for example of porous hollow fibres, for example of materials chosen from polysulphones, polyvinylidene fluorides, polyvinylpyrrolidones, cellulose acetate, polyether sulphones, ceramics. These materials can further have undergone surface modifications, or be added with additives in the bulk, so as to enhance their hydrophilic character.

As represented in detail in FIG. 1, the coalescer 40 has a substantially cylindrical shape and a case 404 enclosing a grid 401 which holds a set of hollow fibres 403 extending longitudinally. A central channel 402 connected to outside by means of two apertures 42 and 45, which are also in communication with outside of the hollow fibres, passes through the coalescer 40. All of the fibres, parallel to the central channel, are also in communication with inside by means of two collectors 41, 43. The central channel is used to convey the phase to be treated to inside the coalescer, this phase then wetting on the outer surface of the fibres.

As represented in detail in FIG. 2, the coalescer 40 can be integrated into a device by means of an inlet collector 41 activated by a pump 44', and an outlet collector 43. The outlet 43 of the channel can be connected to the inlet 41 via a recirculation loop comprising the pump 44' and a valve 49 and/or can also be connected to another circuit by means of another pump 48 and another valve 47.

The general operating principle of the coalescer in the invention will now be set out. The liquid desired to be filtered from the other liquid remaining in a trace state is introduced in one of the collectors 42, 45, the collector 45 becoming the inlet collector and the collector 42 becoming the outlet collector. This liquid to be purified is then flown longitudinally along the outer surface of the fibres. The other liquid is introduced in one of both apertures 41, 43, such that it flows in the reverse direction (that is in countercurrent) inside the fibres. The pressure of the liquid to be filtered is higher than the pressure of the other liquid. Because of the pressure differential (about two bars) and of the hydrophobic character of the other liquid, the trace liquid passes through the porous wall of the fibres and rejoins inside the fibres to flow through the other circuit comprising both apertures 41, 43.

In the case where it is desired to extract from an aqueous effluent traces of hydrophobic liquid membrane, the solid membrane includes hydrophobic hollow fibres that are resistant to organic solvents. The materials are preferentially chosen from the list defined by polypropylenes, polyethylenes, polyvinylidene fluorides, polytetrafluoroethylenes, polyacrylonitriles, polyolefines, polyvinyl chlorides, polyethylene-terephthalates, polyolefine copolymers, polyetheretherketones as well as ceramics.

In the case where it is desired to extract from a hydrophobic liquid membrane aqueous effluent traces, the solid membrane includes hydrophobic hollow fibres that are resistant to organic solvents. The materials are preferentially chosen from the list defined by polysulphones, polyvinylidene fluorides, polyvinylpyrolidones, cellulose acetate, polyether sulphones, optionally modified or with additives, ceramics.

Mixtures or combinations are contemplatable as well as resorting to surface modified polymers, as for example chemically modified polymers with one or more halogen groups by corona discharge or by ion incorporation techniques.

As represented in FIGS. 3, 4, 5 and 6, the desalination facility thus comprises a first module provided with a first desalination enclosure 10. A flow of aqueous effluents, for example seawater, entering the enclosure 10 via the taking means 11 passes through the module, the fresh water being discharged via the means 13. A flow of hydrophobic liquid membrane passes through the enclosure 10 in countercurrent, said flow being taken into the enclosure 10 by the means 14 and being discharged off the enclosure 10 by the means 12.

Advantageously, the first module is an extraction module including, according to a first embodiment, an enclosure consisting of a liquid/liquid extraction column operating in a counter-current way. The extraction column contains a packing to increase the interface between both phases (seawater and hydrophobic liquid membrane) and operate in a counter-current mode. Thus, salted water penetrates at the bottom of the column and exits from the top thereof once it is desalted, whereas the hydrophobic liquid membrane is introduced in the upper part through a dispenser and leaves the column through the bottom, loaded with the salts. In the lower part of the column, coalescence and settling zones enable the hydrophobic liquid membrane to be hydraulically recovered by ion exchange and to be separated from water.

According to another embodiment, the extraction module comprises an enclosure that can be a blender/settler. By blender/settler, it is meant a set of stages connected in series each comprising a blender where a dispersion required for the transfer of material is created, a settler which carries out the mechanical separation of the previously dispersed phases, a connecting network providing counter-current transfer of the coalesced phases.

According to another embodiment, the extraction module comprises an enclosure that can be a stirred column or any other liquid/liquid extraction contactor as described in the techniques de l'ingénieur J 2 756 "Extraction liquide—Description des appareils".

As represented in FIG. 3, the enclosure 20 is in fluid communication with the coalescer 40a with a hydrophobic solid membrane by means of a first inlet bleed 41 in the coalescer provided on the discharge means 24. The coalescer is also in fluid communication by means of second 45 and third 43 bleed of the coalescer, with the means 13 for discharging fresh water off the enclosure 10 and the means 21 for taking the hydrophobic liquid membrane into the enclosure 20 respectively.

Fresh water from the first module is sent to the collector 45 and then longitudinally flows along the outer surface of the fibres. The hydrophobic liquid membrane is introduced through the aperture 41, such that it circulates in counter-current (reverse direction) inside the fibres. The pressure of fresh water is higher than the pressure of the hydrophobic liquid membrane. Because of the pressure differential (about two bars) and because of the hydrophobic character of the hydrophobic liquid membrane, the latter, in a trace state passes through the porous wall of the fibres and joins inside the fibres to join the main flow of hydrophobic liquid membrane and flow through the other aperture 43. The latter reintegrates the first module via the taking means 14.

Thus, the coalescer 40a enables the traces of hydrophobic liquid membrane which remained, to be extracted from the desalted fresh water flow exiting the enclosure 10.

Advantageously, the desalination facility comprises a second regeneration enclosure 20 which enables the hydrophobic liquid membrane to be desalted, once the latter has recovered the salt initially contained in seawater entering the first module. According to the same principle as that of the desalination module, a flow of hydrophobic liquid membrane to be desalted passes through the enclosure 20, which flow enters the enclosure 20 via the taking means 21 themselves connected to the means 12 for discharging from the enclosure 10, the desalted hydrophobic liquid membrane being discharged via the means 24 to reintegrate the first module via the taking means 14, as well as the inlet 41 of the coalescer 40a. A flow of fresh water passes through the enclosure 20 in counter flow, said flow being taken into said module by the means 23 and by being discharged (the water has then turned salted, that is brine) off said module by the means 22.

Advantageously, the second module is a regeneration module consisting according to a first embodiment of a gravity liquid/liquid extraction column. The extraction column contains a packing to increase interface between both phases (fresh water and hydrophobic liquid membrane) and operate in a counter-current mode. Thus, the loaded hydrophobic liquid membrane penetrates through the upper part of the column and is subjected to a salt extraction upon passing along the packing. Then, it exits from the column at the bottom and is conveyed as a liquid regenerated by ion exchanges to the first module. Fresh water penetrates at the bottom of the column and is loaded with salts released from the hydrophobic liquid membrane upon passing along the packing. This brine exits from the column at the top thereof, being loaded with salt.

According to another embodiment, the regeneration module can be a blender/settler. By blender/settler, it is meant a set of stages connected in series each comprising a blender where the dispersion required for the transfer of material is created, a settler which carries out the mechanical separation of the previously dispersed phases, a connecting network providing counter-current transfer of the coalesced phases.

According to another embodiment, the extraction module comprises an enclosure that can be a stirred column or any other liquid-liquid extraction contactor as described in techniques de l'ingénieur J 2 756 "Extraction Liquide—Description des appareils".

This regeneration module can further advantageously comprise a direct contact heat exchanger which heats the regeneration column in order to minimise overall heat loss occurring upon desalting the hydrophobic liquid membrane.

Advantageously, the temperature is brought to between 70 and 90° C., and preferentially around 80° C.

According to an alternative represented in FIG. 4, the desalting facility comprises a first enclosure 10 and a second regeneration enclosure 20 which are in fluid communication in an identical way to the configuration of FIG. 3. On the other hand, the enclosure 20 is now in fluid communication with a coalescer 40a' with a hydrophobic liquid membrane by means of a first inlet bleed 45 in the coalescer provided on the means 22 for discharging brine off the second enclosure 20. The coalescer is also in fluid communication by means of second 42 and a third 43 outlet bleeds of the coalescer, with the means for discharging the brine off the second enclosure 20 and with the means 14 for taking the hydrophobic liquid membrane into the first enclosure 10 respectively.

Brine from the second module is sent to the collector 45 and then flows longitudinally along the outer surface of the fibres. The hydrophobic liquid membrane is introduced through the aperture 41, such that it circulates in the reverse direction inside the fibres. The pressure of brine is higher than the pressure of the hydrophobic liquid membrane. Because of the pressure differential (about two bars) and because of the hydrophobic character of the hydrophobic liquid membrane, the latter, in a trace state passes through the porous wall of the fibres and joins inside the fibres to join the main flow of hydrophobic liquid membrane and flow through the other aperture 43. The brine filtered from the traces of hydrophobic liquid is then conveyed to be treated whereas the flow of hydrophobic liquid recovered is reintegrated in the first module via the taking means 14.

Thus, the coalescer 40a' enables the traces of hydrophobic liquid membrane which remained to be extracted from the flow of brine exiting the second regeneration module.

According to another alternative represented in FIG. 5, the desalination facility comprises a first desalination enclosure 10 and a second regeneration enclosure 20 which are in fluid communication in an identical way to the configuration of FIGS. 3 and 4. On the other hand, the enclosure 10 is now in fluid communication with a coalescer 40b by means of a first (inlet) 41 and a second (outlet) 43 bleed in the coalescer provided on the means 11 for taking seawater into the enclosure 10. The coalescer is also in fluid communication by means of a third (inlet) 45 and a fourth (outlet) 42 bleed in the coalescer, with the means 12 for discharging the hydrophobic liquid membrane off the enclosure 10 of the first module.

The hydrophobic liquid from the enclosure 10 is sent to the collector 45 and then longitudinally flows along the outer surface of the fibres. Water is introduced through the aperture 41, such that it circulates in the reverse direction inside the fibres. The pressure of water is lower than the pressure of the hydrophobic liquid membrane. Because of the pressure differential (about two bars) and because of the hydrophobic character of the hydrophobic liquid membrane, water, in a trace state passes through the porous wall of the fibres of the hydrophilic membrane and joins inside the fibres to join the main flow water and flow through the other outlet aperture 43, to join the circuit 11 for taking into the enclosure 10. The hydrophobic liquid from the coalescer is then filtered from water traces and is sent back via the outlet 42 to the second module to be desalted.

Thus, the coalescer 40b enables the water traces which remained to be extracted from the flow of hydrophobic liquid membrane exiting the first module.

According to a further alternative represented in FIG. 6, the desalination facility comprises a first desalination enclosure 10 and a second regeneration enclosure 20 which are in fluid communication in an identical way to the configuration of FIGS. 3, 4 and 5. On the other hand, the enclosure 10 is now in fluid communication with a hydrophilic coalescer 40b' by means of a first (inlet) 41 and a second (outlet) 43 bleed in the coalescer provided on the means 11 for taking seawater into the enclosure 10. The coalescer is also in fluid communication by means of a third (inlet) 45 and a second (outlet) 42 bleed in the coalescer, with the means 24 for discharging the hydrophobic liquid membrane off the enclosure 20 of the second module.

The hydrophobic liquid from the enclosure 20 is sent to the collector 45 and then flows longitudinally along the outer surface of the fibres. Water is introduced through the aperture 41, such that it circulates in the reverse direction inside the fibres. The pressure of water is lower than the pressure of the hydrophobic liquid membrane. Because of the pressure differential (about two bars) and because of the hydrophobic character of the hydrophobic liquid membrane, water, in a trace state passes through the porous wall of the fibres of the hydrophilic membrane and joins inside the fibres to join the main water flow and flow through the other outlet aperture 43, to join the circuit 11 for taking into the enclosure 10. The hydrophobic liquid from the coalescer is thus filtered from water traces and is sent back via the outlet 42 to the first module.

Thus, the coalescer 40b' enables the water traces caused by regeneration, which remained to be extracted from the flow of hydrophobic liquid membrane exiting the second module.

As regard the desalination process now, whether in the case of seawater desalination or the hydrophobic liquid membrane, the latter comprises at least the following steps:

(a) liquid-liquid extraction, by contacting seawater with a water immiscible hydrophobic liquid membrane, allowing ion transfer from the aqueous phase to the hydrophobic liquid phase, (b) separating seawater and the hydrophobic liquid membrane from step (a), (c) contacting desalted seawater from step (b) with a hydrophobic solid membrane, in order to remove the residual hydrophobic liquid membrane in desalted water by coalescence on said hydrophobic solid membrane.

To formulate the hydrophobic liquid membrane, at least one compound chosen from the category of anionic surfactants and/or cationic surfactants, and/or calixarenes, preferentially calix[4]arenes, and/or crown ethers, preferentially 18-6 crown ethers, or 12-4 crown ethers or 15-5 crown ethers, and/or dithizones is used.

The anionic surfactants can be chosen from carboxylate salts, alkyl benzoates, carboxiimidates, alkoxides or dialkoxides, alkylsulphates, alkylsulphonates, ether sulphonates, sulphonylimides, phosphine oxides, phosphinates, alkyl borates.

The cationic surfactants can be chosen from alkylsulphonium, alkylammonium, alkylphosphonium, alkylimidazolium, alkyloxazaborolidinium, alkyloxazolidinium salts.

The separation step (b) can be a settling step.

The hydrophobic solid membrane is manufactured from a material chosen from polypropylenes, polyethylenes, polyvinylidene fluorides, polytetrafluoroethylenes, polyacrylonitriles, polyolefines, polyvinyl chlorides, polyethylene-terephthalates, polyolefine copolymers, polyetherketones as well as ceramics.

A hydrophobic solid membrane consisting of hollow fibres is preferentially employed.

According to one alternative, the liquid-liquid extraction (a) and separation (b) steps are made in a first treatment enclosure, whereas the aqueous effluent and the hydrophobic liquid membrane are separately extracted off the first treatment enclosure at the end of steps (a) and (b), and whereas contacting the aqueous effluent from step (b) with a hydrophobic solid membrane, occurs after the aqueous effluent is discharged off the first treatment enclosure.

According to another alternative, the liquid-liquid extraction (a) and separation (b) steps are made in a first treatment enclosure, whereas the aqueous effluent treated and the hydrophobic liquid membrane are separately extracted off the first treatment enclosure at the end of steps (a) and (b), and whereas contacting the aqueous effluent from step (b) with a hydrophobic solid membrane, occurs before the aqueous effluent treated is discharged off the first treatment enclosure.

The step of contacting the aqueous effluent from step (b) with the hydrophobic solid membrane is made in a substantially cylindrical shaped contactor, provided with a central channel and a hydrophobic solid membrane consisting of longitudinal porous and hollow fibres, such that the residual hydrophobic liquid membrane radially migrates up to inside the fibres. The circulation of fluids inside this contactor could be in co-current, counter-current or in cross flow circulation.

The treatment process can further comprise a step (e) of contacting the hydrophobic liquid membrane from step (b) with a hydrophilic solid membrane, in order to remove the residual effluent in the hydrophobic liquid membrane, by coalescence on said hydrophilic solid membrane.

The hydrophilic solid membrane at least consists of a material chosen from polysulphones, polyvinylidene fluorides, polyvinylpyrolidones, cellulose acetate, polyether sulphones, optionally modified or with additive, ceramics.

The process can further comprise a step of regenerating (d) the hydrophobic liquid membrane from step (b).

According to one alternative, the hydrophobic liquid membrane extracted from the first treatment enclosure is taken into a second regeneration enclosure where it is contacted with water, the regenerated hydrophobic liquid membrane and water being then separated and discharged off the second enclosure, and the regenerated hydrophobic liquid membrane being then contacted with a hydrophilic solid membrane after discharging off the second enclosure so as to remove water traces.

The hydrophobic liquid membrane from the coalescence step can be reused in step (a) of the treatment process.

The regeneration of the hydrophobic liquid membrane can be made between 70 and 90° C., preferentially around 80° C.

The pressure differential during step (c) of contacting with a hydrophobic solid membrane, can be between 1 and 5 bars.

The pressure differential during step (e) of contacting with a hydrophilic solid membrane, can be between 1 and 5 bars.

In summary, the coalescer can be used when it is connected to the outlet of the aqueous effluent treated in the first module, to recover the traces of hydrophobic liquid membrane which would be accidentally dispersed as droplets in the extraction column of the first module. Thus, this avoids contamination of the aqueous effluent treated by the hydrophobic liquid membrane.

The coalescer can also be used when it is connected to the second module, to recover the traces of hydrophobic liquid membrane which would be accidentally dispersed as droplets in the regeneration column of the second module. This thus avoids contamination of the brine from the desalination of the hydrophobic liquid membrane, by the hydrophobic liquid membrane.

Alternatively, the coalescer can be used when it is connected to the second module, to recover the water traces which would be accidentally dispersed as droplets in the regeneration column of the second module. Thus, this avoids contamination of the hydrophobic liquid membrane by the water used in the regeneration column.

The coalescer can be used when it is connected to the outlet of the hydrophobic liquid membrane of the first module, to recover the water traces which would escape from the system because of an uncontrolled emulsion of solvent/water phases or an improper coalescence/settling in the lower part of the extraction column. This thus avoids to worsen the heat balance of the heat exchanger associated with the first module. This also enables the capacity of the hydrophobic liquid membrane of carrying out ion collection to be preserved.

Alternatively, the invention also comprises the case where the desalination enclosure 10 and the coalescer form one and a single unit consisting mainly of a membrane contactor. This configuration is represented in FIG. 7.

In this configuration, the step of coalescing the desalted effluent and/or the hydrophobic liquid membrane occurs in said enclosure 40, which is a hydrophobic solid membrane contactor, before discharging the desalted effluent and the hydrophobic liquid membrane off this enclosure. In this configuration, the effluent is desalted by the hydrophobic liquid membrane upon contacted in the contactor and, concomitantly, there is a coalescence of the hydrophobic liquid membrane so as to remove traces thereof present in the effluent.

In other words, liquid-liquid extraction is carried out (a) by contacting the aqueous effluent with a water immiscible hydrophobic liquid membrane, allowing ion transfer from the aqueous phase to the hydrophobic liquid phase, and then, the aqueous effluent from step (a) is contacted with a hydrophobic solid membrane, in order to carry out steps (b) and (c) concomitantly.

Figure 7:
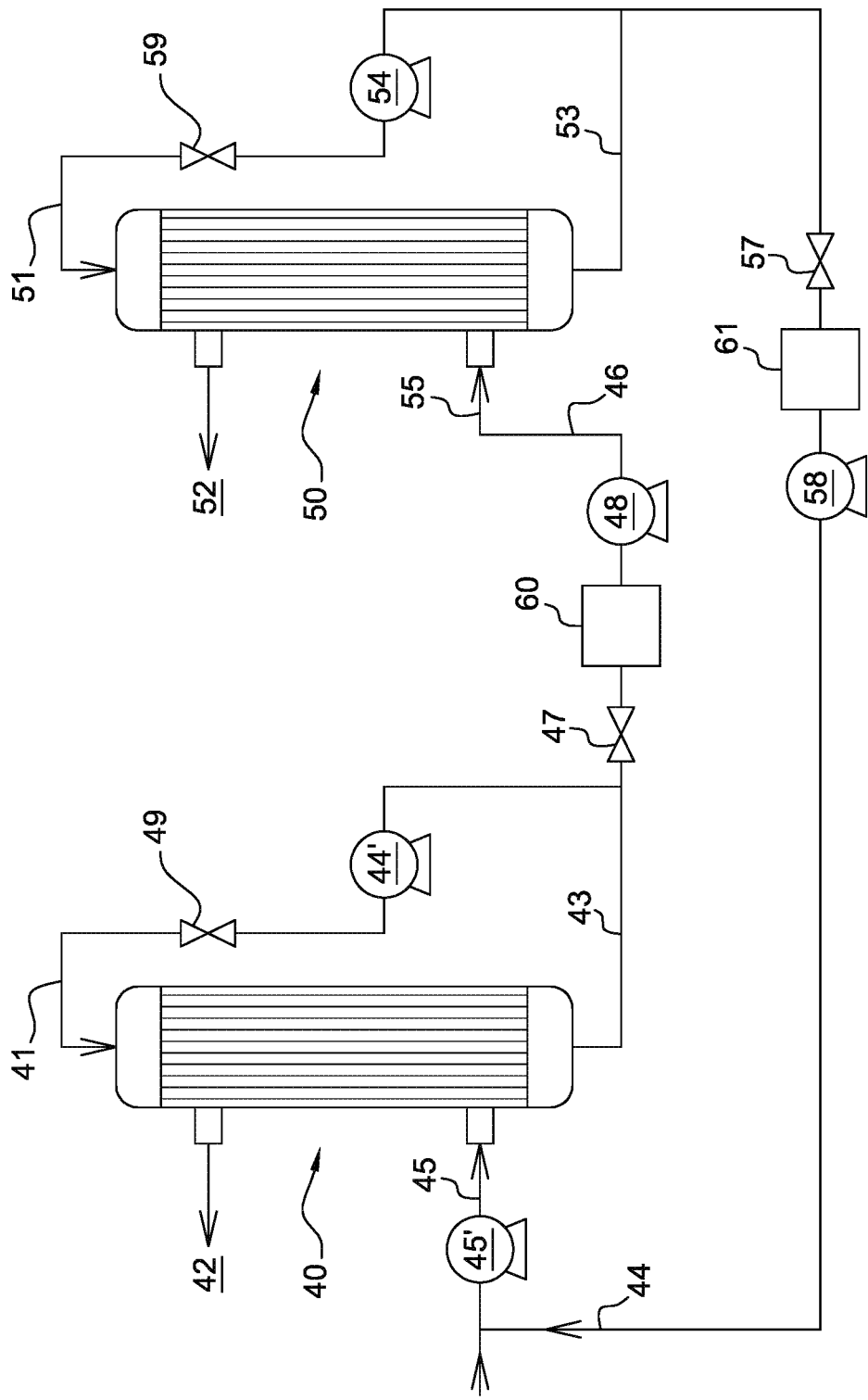

More particularly and as represented in FIG. 7, a desalination facility integrating these particular modules has been represented.

The facility comprises a desalination coalescer 40 provided with a substantially cylindrical shaped contactor, provided with a central channel and a hydrophobic solid membrane consisting of longitudinal porous and hollow fibres. The coalescer is provided with taking means 45 into the central channel, discharging means 42 off the central channel, taking 41 and discharging 43 means connected to a first recirculation loop communicating with inside the longitudinal fibres. This recirculation loop comprises a valve 49 and a pump 44'.

The facility also comprises a regeneration coalescer 50 provided with a substantially cylindrical shaped contactor, provided with a central channel and a hydrophobic solid membrane consisting of longitudinal porous and hollow fibres, means 55 for taking into the central channel connected to the first recirculation loop and to a water point 60. The regeneration coalescer 50 is also provided with means 52 for discharging off the central channel, taking 51 and discharging 52 means connected to a second recirculation loop communicating with inside the longitudinal fibres. This recirculation loop comprises a valve 59 and a pump 54. A bleed onto this second recirculation loop puts the latter in communication with the inlet 45 of the desalination coalescer, by means of a line 44 also comprising a valve 57, a pump 58 as well as a water point 61.

In a more detailed way, the hydrophobic liquid blended with water to be desalted is sent into the coalescer 40 by the collector 45 and then flows longitudinally along the outer surface of the fibres. Blending between water to be desalted and the hydrophobic liquid membrane occurs in a blended unit 45' which can be a pump, a static blender, or any other blending device. The blending unit is consequently connected at the inlet thereof to a port 44 dedicated to the hydrophobic liquid membrane and to a port dedicated to water to be desalted.

The hydrophobic liquid membrane is introduced through the aperture 41, such that it circulates in the reverse direction inside the fibres. The pressure of the hydrophobic liquid membrane is lower than the pressure of the water+hydrophobic liquid membrane mixture. Because of the pressure differential (about two bars) and because of the hydrophobic character of the hydrophobic liquid membrane, which thus has an affinity with the hydrophobic solid membrane, the hydrophobic liquid membrane contained outside the fibres passes through the porous wall of the fibres (by catching with it the salt extracted from the water to be desalted) and joins inside the fibres to join the main flow of hydrophobic liquid membrane and flow through the other outlet aperture 43. Part of this flow is then sent back into the coalescer 40 through the aperture 41 and the other part is sent back via the inlet 55 to the coalescer 50 to be desalted. The desalted water free of salt and of hydrophobic liquid membrane exits the coalescer 40 through the outlet 42.

In order to regenerate the hydrophobic liquid membrane, a water supply is made in 60 before being taken into the coalescer 50 via a line 46 provided with a pump 48 and a valve 47. The water+hydrophobic liquid membrane mixture is then sent in the coalescer via the intake 55 and then longitudinally flows along the outer surface of the fibres. The hydrophobic liquid membrane is introduced through the aperture 51, such that it circulates in the reverse direction inside the fibres. The pressure of the hydrophobic liquid membrane is lower than the pressure of the water+hydrophobic liquid membrane mixture. Because of the pressure differential (about two bars) and because of the hydrophobic character of the hydrophobic liquid membrane, which thus has an affinity with the hydrophobic solid membrane, the hydrophobic liquid membrane contained outside the fibres passes through the porous wall of the fibres and joins inside the fibres to join the main flow of hydrophobic liquid membrane and flow through the other outlet aperture 53. Part of this flow is then sent back into the coalescer 50 through the aperture 51 and the other part is sent back via the line 44 to the inlet 45 of the coalescer 40 as a regenerated hydrophobic liquid membrane. Brine (water concentrated in salts) exits the coalescer 50 through the outlet 52.

In this configuration, the hydrophobic liquid membrane is desalted by fresh water (becoming brine) upon contacting in the contactor, and, concomitantly, there is a coalescence of the brine so as to remove traces thereof from the hydrophobic liquid membrane. The latter can be reused without worsening or losses.

The configuration according to which there is one and a single unit of the "membrane contactor" type, to provide desalination by contacting an effluent with a hydrophobic liquid membrane, and coalescence, is particularly advantageous because of its compactness.

The desalted effluent offers on the other hand an excellent treatment quality insofar as, when it passes through the contactor, it enables both the hydrophobic liquid membrane and the salt trapped in the same to be synergistically extracted.

The embodiments described above are in no way limiting, consequently alternative embodiments could in particular be considered, only comprising a selection of described characteristics, isolated from the other characteristics described (even if this selection is isolated within a sentence comprising these other characteristics), if this selection of characteristics is sufficient to provide a technical advantage or to differentiate the invention with respect to the state of prior art. This selection comprises at least one characteristic, which is preferentially functional without structural details, or with only a part of the structural details if this part only is sufficient to provide a technical advantage or to differentiate the invention with respect to the state of prior art.

In summary, the process for treating an aqueous effluent according to the invention enables in particular an aqueous effluent to be desalted by successively carrying out the three steps (a), (b) and (c) or by carrying out first step (a) and then concomitantly steps (b) and (c).

The process for treating an aqueous effluent according to the invention thus comprises the following steps:
  (a) liquid-liquid extraction, by contacting the aqueous effluent with a water immiscible hydrophobic liquid membrane, allowing ion transfer from the aqueous phase to the hydrophobic liquid phase, and then,
  (b) separating the aqueous effluent and the hydrophobic liquid membrane from step (a), and then,
  (c) contacting the aqueous effluent from step (b) with a hydrophobic solid membrane, in order to remove the residual hydrophobic liquid membrane in said effluent by coalescence on said hydrophobic solid membrane,
  or
  (a) liquid-liquid extraction, by contacting the aqueous effluent with a water immiscible hydrophobic liquid membrane, allowing ion transfer from the aqueous phase to the hydrophobic liquid phase, and then,
  (b and c) contacting the aqueous effluent from step (a) with a hydrophobic solid membrane, in order to carry out steps (b) and (c) concomitantly.

Of course, the invention is not limited to the examples just described and many modifications can be provided to these examples without departing from the scope of the invention. Moreover, the different characteristics, forms, alternatives and embodiments of the invention can be associated with each other according to various combinations insofar as they are not incompatible or exclusive to each other.

Thus, it is possible to extend the invention to other liquid membranes, for other specific applications by changing the combinations of active molecules, salts of cationic or anionic surfactants, or crown ether, calixarene type "cages" molecules, . . . . Their formulation could be adapted to extract salts present in a wide range of effluents from petrol and gas industry, waters from mining, landfill leachates, waste water from incinerating plants.

The invention claimed is:
1. A process for the treatment of an aqueous effluent comprising the steps of:
  (a) liquid-liquid extraction, by contacting the aqueous effluent with a water immiscible hydrophobic liquid membrane, allowing ion transfer of target ions from the aqueous effluent to the hydrophobic liquid membrane, thereby to produce a treated aqueous effluent that is depleted in said target ions,
  (b) separating the treated aqueous effluent from the hydrophobic liquid membrane from step (a),
  (c) contacting the treated aqueous effluent from step (b) with a hydrophobic solid membrane, in order to remove the residual hydrophobic liquid membrane in said treated aqueous effluent by coalescence on said hydrophobic solid membrane.

2. The process according to claim 1, wherein the hydrophobic liquid membrane comprises at least one compound chosen from the group of anionic surfactants and/or cationic surfactants, and/or calixarenes, preferentially calix[4]arenes, and/or crown ethers, preferentially 18-6 crown ethers, or 12-4 crown ethers or 15-5 crown ethers, and/or dithizones.

3. The process according to claim 2, wherein the anionic surfactants are chosen from carboxylate salts, alkyl benzoates, carboxiimidates, alkoxides or dialkoxides, alkylsulphates, alkylsulphonates, ether sulphonates, sulphonylimides, phosphine oxides, phosphinates, alkyl borates.

4. The process according to claim 2, wherein the cationic surfactants are chosen from alkylsulphonium, alkylammonium, alkylphosphonium, alkylimidazolium, alkyloxazaborolidinium, alkyloxazolidinium salts.

5. The process according to claim 1, wherein the separation step (b) is a settling step.

6. The process according to claim 1, wherein the hydrophobic solid membrane comprises a material chosen from polypropylenes, polyethylenes, polyvinylidene fluorides, polytetrafluoroethylenes, polyacrylonitriles, polyolefines, polyvinyl chlorides, polyethylene-terephthalates, polyolefine copolymers, polyetherketones.

7. The process according to claim 1, wherein the hydrophobic solid membrane consists of porous hollow fibres.

8. The treatment process according to claim 1, wherein:
  the liquid-liquid extraction (a) and separation (b) steps are made in a first treatment enclosure,
  the aqueous effluent and the hydrophobic liquid membrane are separately extracted off the first treatment enclosure at the end of steps (a) and (b), contacting the aqueous effluent from step (b) with a hydrophobic solid membrane occurs after said aqueous effluent is discharged off the first treatment enclosure.

9. The treatment process according to claim 1, wherein:
the liquid-liquid extraction (a) and separation (b) steps are made in a first treatment enclosure,
the treated aqueous effluent and the hydrophobic liquid membrane are separately extracted off the first treatment enclosure at the end of steps (a) and (b),
contacting the treated aqueous effluent from step (b) with a hydrophobic solid membrane occurs before said treated aqueous effluent is discharged from the first treatment enclosure.

10. The treatment process according to claim 1, wherein the step of contacting the treated aqueous effluent from step (b) with the hydrophobic solid membrane is made in a substantially cylindrical shaped contactor, provided with a central channel and a hydrophobic solid membrane consisting of longitudinal porous and hollow fibres, and wherein the residual hydrophobic liquid membrane radially migrates up to inside the fibres.

11. The treatment process according to claim 1, further comprising a step (e) of contacting the hydrophobic liquid membrane from step (b) with a hydrophilic solid membrane, in order to remove the residual effluent in the liquid membrane, by coalescence on said hydrophilic solid membrane.

12. The process according to claim 11, wherein the hydrophilic solid membrane comprises a material chosen from polysulphones, polyvinylidene fluorides, polyvinylpyrolidones, cellulose acetate, polyether sulphones, optionally modified or with additive, ceramics.

13. The process according to claim 1, further comprising a step of regenerating (d) the hydrophobic liquid membrane from step (b).

14. The treatment process according to claim 13, wherein:
the hydrophobic liquid membrane extracted from the first treatment enclosure is taken into a second regeneration enclosure where it is contacted with water,
the regenerated hydrophobic liquid membrane and water are separated and discharged from the second enclosure,
the regenerated hydrophobic liquid membrane is contacted with a hydrophilic solid membrane after discharging from the second enclosure.

15. The treatment process according to claim 1, wherein the hydrophobic liquid membrane from the coalescence step is reused in step (a) of the treatment process.

16. A process according to claim 1, wherein the treatment is a treatment of desalination of water, in particular desalination of seawater.

17. The desalination process according to claim 16, further comprising regenerating the hydrophobic liquid membrane between 70 and 90° C., preferentially around 80° C.

18. The desalination process according to claim 16, wherein the pressure differential during step (c) of contacting with a hydrophobic solid membrane, is between 1 and 5 bars.

19. Module for desalination by contacting an aqueous effluent with a hydrophobic liquid membrane for the implementation of the process according to claim 16, the module including at least one desalination enclosure (10), means for taking (11) and discharging (13) the effluent, respectively, into and from said enclosure, means for taking (14) and discharging (12) the hydrophobic liquid membrane, respectively, into and from said enclosure, further comprising a first coalescer (40a) in fluid communication with said enclosure by means of a first inlet bleed (45) in the coalescer provided on the means for discharging the effluent off said enclosure, in order to remove traces of hydrophobic liquid membrane residually present in the aqueous effluent.

20. The desalination module according to claim 19, wherein the coalescer (40a) is in fluid communication by means of second (41) and third (43) outlet bleeds, with respectively the means for taking and discharging the hydrophobic liquid membrane, into and from said enclosure.

21. The desalination module according to claim 19, wherein the hydrophobic liquid membrane comprises at least one compound chosen from the group of anionic surfactants and/or cationic surfactants, and/or calixarenes, preferentially calix[4]arenes, and/or crown ethers, preferentially 18-6 crown ethers, or 12-4 crown ethers or 15-5 crown ethers, and/or dithizones.

22. The desalination module according to claim 21, wherein the anionic surfactants are chosen from carboxylate salts, alkyl benzoates, carboxiimidates, alkoxides or dialkoxides, alkylsulphates, alkylsulphonates, ether sulphonates, sulphonylimides, phosphine oxides, phosphinates, alkyl borates.

23. The desalination module according to claim 21, wherein the cationic surfactants are chosen from alkylsulphonium, alkylammonium, alkylphosphonium, alkylimidazolium, alkyloxazaborolidinium, alkyloxazolidinium salts.

24. The desalination module according to claim 19, wherein the first coalescer is a substantially cylindrical shaped contactor (40a), provided with a central channel (402) and a hydrophobic solid membrane consisting of longitudinal porous and hollow fibres (403).

25. The desalination module according to claim 24, wherein the materials making up the hydrophobic solid membrane are chosen in the list defined by polypropylenes, polyethylenes, polyvinylidene fluorides, polytetrafluoroethylenes, polyacrylonitriles, polyolefines, polyvinyl chlorides, polyethylene-terephthalates, polyolefine copolymers, polyetheretherketones, as well as ceramics.

26. The desalination module according to claim 19, wherein the desalination enclosure comprises a liquid/liquid extraction column.

27. The desalination module according to claim 19, wherein the desalination enclosure comprises a blender/settler.

28. The desalination module according to claim 19, wherein the desalination enclosure (10, 20) and the coalescer form one and a single unit consisting of a membrane contactor.

29. The desalination module according to claim 19, further comprising a second coalescer (40b) in fluid communication with the desalination enclosure of the first module (10) by means of a first inlet bleed in the coalescer provided on the means for discharging the hydrophobic liquid membrane off said enclosure, in order to remove traces of aqueous effluent residually present in the hydrophobic liquid membrane.

30. The desalination module according to claim 29, wherein the second coalescer (40b) is in fluid communication by means of second and third outlet bleeds, with respectively the means for taking the aqueous effluent into the enclosure of the first module (10).

31. The desalination module according to claim 29, wherein the second coalescer is a substantially cylindrical shaped contactor (40b), provided with a central channel (402) and a hydrophilic solid membrane consisting of longitudinal porous and hollow fibres (403).

32. The desalination module according to claim 24, wherein the materials making up the hydrophilic solid membrane are chosen from the list defined by polysulphones, polyvinylidene fluorides, polyvinylpyrolidones, cellulose acetate, polyether sulphones, optionally modified or with additives, ceramics.

33. A facility for desalination of an aqueous effluent, in particular of seawater, the facility comprising a first desalination module in accordance with claim 19.

34. The desalination facility according to claim 33, further comprising a second module (20) for regenerating the hydrophobic liquid membrane, the means (14) for taking the hydrophobic liquid membrane into the first desalination module of the aqueous effluent (10) being in fluid communication with the means (24) for discharging the hydrophobic liquid membrane from the second regeneration module of the hydrophobic liquid membrane, whereas the means (21) for taking the hydrophobic liquid membrane into the second regeneration module are in fluid communication with the means (12) for discharging the hydrophobic liquid membrane from the first desalination module.

35. The desalination facility according to claim 34, further comprising a third coalescer (40a') in fluid communication with the regeneration enclosure of the second module (20) by means of a first inlet bleed in the coalescer provided on the mean for discharging the brine off said enclosure, in order to remove the traces of hydrophobic liquid membrane residually present in the brine.

36. A desalination module for contacting an aqueous effluent with a hydrophobic liquid membrane for the implementation of the process according to claim 16 and according to which the liquid-liquid extraction is carried out by contacting the aqueous effluent with a water immiscible hydrophobic liquid membrane, allowing ion transfer from the aqueous phase to the hydrophobic liquid phase, and then contacting the aqueous effluent from step (a) with a hydrophobic solid membrane in order to concomitantly carry out steps (b) and (c), further comprising a desalination coalescer (40) provided with a substantially cylindrical shaped contactor, provided with a central channel and a hydrophobic solid membrane consisting of longitudinal porous and hollow fibres, means (45) for taking into the central channel a mixture consisting of the aqueous effluent and a hydrophobic liquid membrane and made in a unit (45'), means (42) for discharging the desalted effluent from the central channel, means for taking (41) and discharging (43) connected to a first hydrophobic liquid membrane recirculation loop (44', 49) inside the longitudinal fibres.

37. The facility for desalination of an aqueous effluent, in particular of seawater, comprising a first desalination module in accordance with claim 36.

38. The desalination facility according to claim 37, further comprising a second module for regenerating the hydrophobic liquid membrane, said second module comprising a regeneration coalescer (50) provided with a substantially cylindrical shaped contactor, provided with a central channel and with a hydrophobic solid membrane consisting of longitudinal porous and hollow fibres, means for taking (55) into the central channel a mixture consisting of fresh water from a water point (60) and a hydrophobic liquid membrane from the first recirculation loop (44', 49), means for discharging (52) the brine off the central channel, means for taking (51) and discharging (52) connected to a second hydrophobic liquid membrane recirculation loop (54, 59) inside the longitudinal fibres of the contactor.

* * * * *